(12) United States Patent
Kim et al.

(10) Patent No.: US 9,541,693 B2
(45) Date of Patent: *Jan. 10, 2017

(54) POLARIZED LIGHT SPLITTING ELEMENT

(71) Applicant: LG CHEM, LTD., Seoul (KR)

(72) Inventors: Tae Su Kim, Daejeon (KR); Jeong Ho Park, Daejeon (KR); Bu Gon Shin, Daejeon (KR); Jae Jin Kim, Daejeon (KR); Jong Byung Lee, Daejeon (KR); Jin Mi Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/039,924

(22) Filed: Sep. 27, 2013

(65) Prior Publication Data

US 2014/0021367 A1  Jan. 23, 2014

Related U.S. Application Data

(63) Continuation of application No. PCT/KR2012/010492, filed on Dec. 5, 2012.

(30) Foreign Application Priority Data

Dec. 5, 2011 (KR) .................. 10-2011-0128920
Dec. 5, 2012 (KR) .................. 10-2012-0140562

(51) Int. Cl.
*G02B 5/30* (2006.01)
*B01J 19/12* (2006.01)
*B29D 11/00* (2006.01)
*G02B 5/18* (2006.01)
*G02B 27/28* (2006.01)

(52) U.S. Cl.
CPC .............. *G02B 5/3091* (2013.01); *B01J 19/12* (2013.01); *B29D 11/00* (2013.01);
(Continued)

(58) Field of Classification Search
None
See application file for complete search history.

(56) References Cited

U.S. PATENT DOCUMENTS 7,339,734 B2 * 3/2008 Amako et al. ........... 359/485.05
2006/0146231 A1   7/2006 Amako et al.
(Continued)

FOREIGN PATENT DOCUMENTS

JP   11211422 A    8/1999
JP   2006201273 A  8/2006
(Continued)

OTHER PUBLICATIONS

Filmetrics. Refractive Index of MgF2, Magnesium Fluoride. Retrieved Jul. 13, 2015. <http://www.filmetrics.com/refractive-index-database/MgF2/Magnesium-Fluoride>.*

*Primary Examiner* — Derek S Chapel
(74) *Attorney, Agent, or Firm* — Dentons US LLP

(57) ABSTRACT

Provided are a polarized light splitting element, a method of manufacturing the same, a light radiating device, a method of radiating light, and a method of manufacturing an ordered photo-alignment film. The polarized light splitting element has excellent durability with respect to UV rays and heat, and low pitch dependence of polarization characteristics, so that it is easily manufactured. In addition, the polarized light splitting element may realize a high polarization degree and extinction ratio even in a short wavelength region.

14 Claims, 5 Drawing Sheets

(52) U.S. Cl.
CPC ...... *B29D 11/00644* (2013.01); *G02B 5/1838* (2013.01); *G02B 5/3058* (2013.01); *G02B 5/3075* (2013.01); *G02B 27/283* (2013.01)

(56) References Cited

U.S. PATENT DOCUMENTS

| | | | |
|---|---|---|---|
| 2007/0183035 A1* | 8/2007 | Asakawa et al. | 359/486 |
| 2008/0018997 A1* | 1/2008 | Kawazu et al. | 359/486 |
| 2009/0041971 A1 | 2/2009 | Wang et al. | |
| 2009/0053655 A1 | 2/2009 | Deng et al. | |
| 2009/0231702 A1 | 9/2009 | Wu et al. | |
| 2010/0225832 A1* | 9/2010 | Kumai | 349/8 |
| 2010/0265571 A1* | 10/2010 | Wang et al. | 359/352 |
| 2013/0335815 A1* | 12/2013 | Kim et al. | 359/352 |

FOREIGN PATENT DOCUMENTS

| | | |
|---|---|---|
| JP | 2006-330521 | 12/2006 |
| JP | 200986192 A | 4/2009 |
| JP | 2010501085 A | 1/2010 |
| JP | 2010277077 A | 12/2010 |
| KR | 10-0323731 | 1/2002 |
| KR | 10-2002-0035587 | 5/2002 |
| KR | 10-0323731 B1 | 5/2002 |
| KR | 10-2003-0097839 A | 12/2003 |
| KR | 10-0751597 B1 | 8/2007 |
| KR | 10-2010-0049766 A | 5/2010 |
| KR | 10-2010-0118539 | 11/2010 |
| KR | 10-2010-0118539 A | 11/2010 |
| WO | 01/18570 A1 | 3/2001 |

* cited by examiner

POLARIZED LIGHT SPLITTING ELEMENT

This application is a bypass continuation of International Application No. PCT/KR2012/010492, filed Dec. 5, 2012, and claims the benefit of Korean Patent Application Nos. 10-2011-0128920, filed on Dec. 5, 2011, and 10-2012-0140562, filed Dec. 5, 2012, all of which are hereby incorporated by reference in their entirety for all purposes as if fully set forth herein.

TECHNICAL FIELD

The present application relates to a polarized light splitting element, a method of manufacturing the same, a light radiating device, a method of radiating light, and a method of manufacturing an ordered photo-alignment film.

BACKGROUND ART

A liquid crystal alignment film used to align liquid crystal molecules in a certain direction is applied in various fields. As a liquid crystal alignment film, a photo-alignment film serving as a surface treated by radiation of light and capable of aligning adjacent liquid crystal molecules is used. Conventionally, the photo-alignment film may be manufactured by orientationally ordering a photosensitive material by radiating light, for example, linearly polarized light, to a layer of the photosensitive material.

To radiate the linearly polarized light to the photo-alignment film, various kinds of polarized light splitting elements may be used.

For example, as the polarized light splitting element, a polarized light splitting element using aluminum is disclosed in Korean Patent Application Publication No. 2002-0035587 (Reference 1).

Also, in general, the polarized light splitting element for polarizing light in a UV region may have a linear grid pattern with a pitch of 120 nm or less.

DISCLOSURE

Technical Problem

The present application is directed to providing a polarized light splitting element, a method of manufacturing a polarized light splitting element, a light radiating device, a method of radiating light, and a method of manufacturing an ordered photo-alignment film.

Technical Solution

One aspect of the present application provides a polarized light splitting element, which includes a substrate, and an unevenness formed on the substrate, and produces linearly polarized light in a UV region wavelength range. The term "UV region" used herein refers to a region of light having a wavelength of 250 to 350 nm, 270 to 330 nm, and 290 to 310 nm. Hereinafter, referring to the accompanying drawings, the polarized light splitting element will be described in detail.

FIG. 1 is a schematic cross-sectional view of an exemplary polarized light splitting element, FIG. 2 is a schematic diagram of a top surface of the exemplary polarized light splitting element, and FIG. 3 is an image of the exemplary polarized light splitting element, taken from above. As shown in FIGS. 1 and 2, the polarized light splitting element may include a substrate 1 and an unevenness formed on the substrate.

The term "unevenness" used herein refers to a structure (refer to FIG. 2) in which strip patterns having pluralities of convex parts 2a and concave parts 2b are aligned parallel to each other, the term "pitch P" used herein refers to a distance obtained by combining a width W of the convex part 2a with a width of the concave part 2b (refer to FIG. 2), and the term "height" used herein refers to a height H of the convex part (refer to FIG. 1).

As shown in FIG. 1, the exemplary polarized light splitting element may include an unevenness 2, which may have a convex part 2a and a concave part 2b. Here, the convex part 2a may include a light absorbing material. For example, the light absorbing material may have a refractive index of 1 to 10, for example, 1.3 to 8, 1.5 to 9, or 2 to 7, with respect to light having any wavelength in the UV range of 250 to 350 nm, for example, a wavelength of 300 nm. The polarized light splitting element formed of a light absorbing material having a refractive index of less than 1 may have an excellent extinction ratio. The term "extinction ratio" used herein refers to Tc/Tp, and the larger the extinction ratio is, the higher the polarization performance exhibited by a polarization plate may be. Here, Tc represents a transmission rate with respect to the polarized light splitting element of light having a wavelength polarized in a direction perpendicular to the convex part 2a, and Tp represents a transmission rate with respect to the polarized light splitting element of light polarized in a direction parallel to the convex part 2a. In addition, the light absorbing material may have an extinction coefficient of 0.5 to 10, for example, 1 to 5, 1.5 to 7, 2 to 6, or 5 to 10 in a light wavelength range from 250 to 310 nm. When the convex part 2a is formed using a material having an extinction coefficient within the above range, an extinction ratio of the polarized light splitting element is increased, and a total transmittance may also appear excellent.

Particularly, when a light absorbing material having a refractive index of 1 to 10 and an extinction coefficient of 0.5 to 10 in a light wavelength range from 250 to 310 nm is included in the convex part 2a, a pitch of the convex part 2a is not limited, and light in a UV range may be polarized. That is, since the convex part 2a includes the light absorbing material, and thus has a refractive index of 1 to 10 and an extinction coefficient of 0.5 to 10 in a light wavelength range from 250 to 350 nm, dependence on a pitch P when light in the UV range is polarized may be lower than for a reflective material such as aluminum. In addition, a pitch of the convex part 2a formed of the light absorbing material to polarize light in a UV range having a short wavelength may be, for example, 50 to 200 nm, 100 to 180 nm, 110 to 150 nm, 120 to 150 nm, 130 to 150 nm, or 140 to 150 nm. When the pitch P is more than 200 nm, which is approximately ½ of the light wavelength range of 400 nm, polarization separation may not occur in the UV range. Since the convex part 2a has a refractive index and extinction coefficient in the above ranges, UV absorption ability is excellent and an extinction ratio is also excellent even at a short wavelength, and thus the polarized light splitting element having an excellent UV polarization degree may be manufactured using the light absorbing material. In one example, an oxidation temperature of the light absorbing material may be 400° C. or more, for example, 500, 600, 700, or 800° C. or more. When the convex part 2a is formed as the light absorbing material having the above-described oxidation temperature, due to the high oxidation temperature of the light absorbing material, a polarized light splitting element having excellent thermal stability and durability may be obtained. Accordingly, when heat generated from a backlight or light source, particularly, light in a UV range is polarized, oxidation by heat generated by UV rays may be prevented, and thus the polarized light splitting element is not transformed and maintains an excellent polarization degree.

In addition, the light absorbing material may be any of various materials known in the art having a refractive index and extinction coefficient in the above range, and may be, but is not limited to, silicon, titanium oxide, zinc oxide, zirconium, tungsten, tungsten oxide, gallium arsenide, gallium antimonide, aluminum gallium arsenide, cadmium telluride, chromium, molybdenum, nickel, gallium phosphide, indium gallium arsenide, indium phosphide, indium antimonide, cadmium zinc telluride, tin oxide, cesium oxide, strontium titanium oxide, silicon carbide, iridium, iridium oxide, or zinc selenium telluride.

In one example, a dielectric material may be present in a concave part of the unevenness. The dielectric material may have a refractive index of 1 to 3 with respect to light having a wavelength of 250 to 350 nm. The dielectric material may not be particularly limited as long as it has a refractive index within the above range, and may be, for example, silicon oxide, magnesium fluoride, silicon nitride, or air. In one example, when the dielectric material is air, the concave part of the unevenness may be a substantially empty space.

In one example, the UV polarized light splitting element may have a of 0.74 to 10, and b of 0.5 to 10, which are calculated by the following Equation 1.

$$(a+bi)^2 = n_1^2 \times (1-W/P) + n_2^2 \times W/P \qquad \text{[Equation 1]}$$

In Equation 1, i is an imaginary number, $n_1$ represents a refractive index of the dielectric material with respect to light having any wavelength in the UV range from 250 to 350 nm, for example, a wavelength of 300 nm, $n_2$ represents a refractive index of the convex part 2a with respect to light having wavelength in the UV range from 250 to 350 nm, for example, a wavelength of 300 nm, W represents a width of the convex part 2a, and P represents a pitch of the convex part 2a.

When the pitch P of the convex part 2a of the unevenness 2 satisfies Equation 1, a polarized light splitting element having a high polarization degree of 0.5, 0.6, 0.7 or 0.9 or more in a short wavelength range, for example, in the light wavelength range from 250 to 350 nm, may be obtained even in the pitch range of 120 nm or more. An upper limit of a value of the polarization degree may be, but is not particularly limited to, 0.98, 0.95 or 0.93, or less in consideration of economic feasibility of a manufacturing process. That is, when the polarization degree is more than 0.98, an aspect ratio (width/height of the convex) of the unevenness of the polarized light splitting element is necessarily increased. Accordingly, it may be difficult to manufacture a polarized light splitting element and the manufacturing process may become complicated. The term "polarization degree" used herein refers to an intensity of polarization with respect to light to be radiated, and is calculated as shown in Equation 3.

$$\text{Polarization degree } D=(Tc-Tp)/(Tc+Tp) \qquad \text{[Equation 3]}$$

Here, Tc represents a transmission rate of light having a wavelength of 250 to 350 nm polarized in a direction perpendicular to the convex part 2a with respect to the polarized light splitting element, and Tp represents a transmission rate of light having a wavelength of 250 to 350 nm polarized in a direction parallel to the convex part 2a with respect to the polarized light splitting element. Here, "parallel" means substantially parallel, and "perpendicular" means substantially perpendicular.

In addition, in one example, the UV polarized light splitting element may have c of 1.3 to 10, and d of 0.013 to 0.1, which are calculated by Equation 2.

$$(c+di)^2 = n_1^2 \times n_2^2/((1-W/P) \times n_2^2 + W \times n_1^2/P) \qquad \text{[Equation 2]}$$

In Equation 1, i is an imaginary number, $n_1$ represents any one wavelength in the UV range from 250 to 350 nm, for example, a refractive index with respect to light having a wavelength of 300 nm, $n_2$ represents any one wavelength of the convex part 2a in the UV range from 250 to 350 nm, for example, a refractive index with respect to light having a wavelength of 300 nm, W represents a width of the convex part 2a, and P represents a pitch of the convex part 2a.

When the pitch P of the convex part 2a of the unevenness satisfies Equation 2, the polarized light splitting element may have a suitable transmission rate for having an excellent polarization separation property, but it may have a lower absorption rate. For these reasons, the polarized light splitting element may be prepared to have a lower height of the convex part 2a.

The height H of the convex part 2a may be, but is not particularly limited to, for example, 20 to 300 nm, 50 to 200 nm, 100 to 150 nm, 150 to 250 nm, or 200 to 280 nm. When the height H of the unevenness 2 is more than 300 nm, an intensity of absorbed light is increased and an absolute intensity of light necessary for photo-alignment may be decreased. Accordingly, when the height H of the unevenness 2 is within the above-described range, the intensity of absorbed light may not be high, thereby manufacturing a suitable polarized light splitting element, and the polarized light splitting element may maintain an excellent UV transmittance and exhibit excellent polarization separation performance. In addition, as the height H of the unevenness 2 is increased at the same pitch P, an aspect ratio may be increased, thereby preventing a decrease in the ease of manufacturing a pattern.

A width W of the convex part 2a may be, but is not limited to, for example, 10 to 160 nm, and particularly, when the pitch of the convex part 2a is 50 to 150 nm, the width W of the convex part 2a may be 10 to 120 nm, 30 to 100 nm, or 50 to 80 nm.

For example, a fill-factor of the unevenness 2 may be 0.2 to 0.8, for example, 0.3 to 0.6, 0.4 to 0.7, 0.5 or 0.75 or 0.45. When the fill-factor of the unevenness satisfies the above range, excellent polarization separation performance may be realized, and a decrease in a polarizing property of the polarized light splitting element may be prevented due to a low intensity of absorbed light. The term "fill-factor" of the unevenness used herein refers to a ratio (W/P) of a width W of the convex part to a pitch P of the convex part.

In addition, the polarized light splitting element may have a of 0.74 to 10, and b of 0.5 to 10, which are calculated by Equation 1, and c of 1.3 to 10 and d of 0.013 to 0.1, which are calculated by Equation 2

$$(a+bi)^2 = n_1^2 \times (1-W/P) + n_2^2 \times W/P \qquad \text{[Equation 1]}$$

$$(c+di)^2 = n_1^2 \times n_2^2/((1-W/P) \times n_2^2 + W \times n_1^2/P) \qquad \text{[Equation 2]}$$

In Equations 1 and 2, i is an imaginary number, $n_1$ represents a refractive index of the dielectric material with respect to light having any one wavelength in the UV range from 250 to 350 nm, for example, a wavelength of 300 nm, $n_2$ represents a refractive index of the convex part 2a with respect to light of any one wavelength in the UV range from 250 to 350 nm, for example, a wavelength of 300 nm, W represents a width of the convex part 2a, and P represents a pitch of the convex part 2a. In Equations 1 and 2, when a, b, c and d satisfy the above ranges, a dependence on the polarizing property according to the pitch P of the polarized light splitting element is decreased. Therefore, even when an unevenness having a pitch value of 120 nm or more is formed in the polarized light splitting element, a high polarization degree and extinction ratio may be realized even in the short wavelength range.

In one example, the substrate 1 included in the polarized light splitting element and serving to support the unevenness 2 may be formed from a material such as quartz, UV-transparent glass, polyvinyl alcohol (PVA), polycarbonate, or an ethylene vinyl acetate (EVA) copolymer. The UV transmittance of the substrate 1 may be, for example, 70, 80, or 90% or more, and when the transmittance is within the above range, a UV transmittance of the polarized light splitting element may be enhanced, thereby manufacturing a photo-alignment film having a high photo-alignment speed.

The polarized light splitting element may have an extinction ratio of 2 or more, for example, 5, 10, 50, 100, or 500 or more. The upper limit of the extinction ratio is not particularly limited, and may be, for example, 2000, 1500, or 1000 or less in consideration of a manufacturing process and an economical aspect. In one example, the polarized light splitting element may have an extinction ratio of 2 to 2000, for example, 5 to 1500, 50 to 2000, 500 to 1500, or 100 to 2000 in the light wavelength range from 250 to 350 nm, which is a short wavelength range. As the polarized light splitting element has an extinction ratio in the above range, it may have excellent polarization performance in the UV range as well as the visible range. For example, when a height of the pattern constituting the polarized light splitting element is increased, the extinction ratio may be increased to more than 2000. However, the polarized light splitting element having an extinction ratio of 2000 or more is not practical, and since an aspect ratio is increased when the height is increased with the same pitch, productivity may be considerably decreased in terms of the process.

Another aspect of the present application provides a method of manufacturing the UV polarized light splitting element described above, which includes forming an unevenness by forming a convex part 2a using a light absorbing material on a substrate, and introducing a dielectric material into a concave part 2b formed by the convex parts 2a.

In addition, in the method of manufacturing a polarized light splitting element, the convex part 2a may by formed by depositing a light absorbing material on a substrate. For example, the light absorbing material may be deposited on a transparent substrate by various vacuum evaporation coating methods known in the art, such as sputtering, chemical vapor deposition (CVD), low pressure CVD (LPCVD), plasma enhanced CVD (PECVD), atmospheric pressure CVD (APCVD), physical vapor deposition (PVD), thermal evaporation deposition, inductive thermal evaporation, electron-beam evaporation deposition, and atomic layer deposition, but the present application is not limited thereto.

In the manufacturing method according to another embodiment, a convex part 2a may be formed on a substrate by a solution process using a coating solution including a light absorbing nano particle or a precursor of the light absorbing material. The solution process refers to a coating process using a solution, and in one exemplary embodiment, the solution process may include a sol-gel process.

In one example, the convex part 2a may be formed by forming a resist pattern on a light absorbing layer deposited on the substrate using the resist pattern.

The resist pattern may be formed by various methods known in the art, for example, photolithography, nano imprint lithography, soft lithography, or interference lithography. The resist pattern may be formed by coating a resist material on the light absorbing layer, exposing the coated layer in a desired pattern using a mask, and developing the exposed pattern, but the present application is not limited thereto.

The convex part 2a may also be formed by a dry or wet etching method using the previously formed resist pattern as a mask.

In one example, wet etching may refer to a method of etching the light absorbing layer using an etching solution, and for example, a method of precipitating the light absorbing layer in an etching solution using a strong base solution such as potassium hydroxide (KOH) or tetramethyl ammonium hydroxide (TMAH), a strong acid solution such as hydrofluoric acid (HF), or a mixture of hydrofluoric acid (HF), nitric acid ($HNO_3$) and citric acid ($CH_3COOH$). In one example, an additive such as isopropylalcohol (IPA) or a surfactant may be added to the etching solution.

Generally, in the case of wet etching, since etching having the same etching speed in vertical and horizontal directions such as isotropic etching is performed, wet etching is not suitable for forming a pattern having a high aspect ratio. However, since the polarized light splitting element does not have a high aspect ratio required to obtain a polarization degree, the convex part 2a may be formed using wet etching. In this case, wet etching has dramatically lower production costs, and a faster process speed than dry etching.

Meanwhile, in one example, the light absorbing layer may selectively use isotropic or anisotropic etching according to a crystal direction. For example, when wet etching is performed on the light absorbing layer crystallized in direction 100, isotropic etching having the same etching speed in every direction may be performed. However, when the light absorbing layer crystallized in direction 110 is etched using a strong base such as KOH, the etching may not be substantially performed in direction 111, thereby realizing anisotropic etching performed in one direction. Thus, using the above-described characteristics, even through wet etching, anisotropic etching having a high aspect ratio may be realized.

In one example, dry etching is a method of etching the light absorbing layer using a gas, and may be, but is not limited to, a known dry etching method such as ion beam etching, RF sputter etching, reactive ion etching, or plasma etching.

In addition, when the light absorbing layer is etched by a dry etching method, the light absorbing layer may be formed to increase ease of etching, and a hard mask layer may be further formed between the resist and the light absorbing layer before forming the resist pattern. The hard mask layer may be formed of any material which is easily etched on the resist, but not etched on the light absorbing layer, without particular limitation, for example, Cr, Ni, SiN, or $SiO_2$. Here, when the hard mask layer is further inserted, an etching rate is considerably increased compared to when only resist is used as an etching mask, so that a pattern having a high aspect ratio may be easily formed.

When the convex part 2a is formed using the resist pattern, the resist pattern may be removed, and in the case of dry etching, the hard mask layer may also be removed after the convex part 2a is formed. The resist pattern or hard mask layer is not particularly limited and may be removed through a photoresist burning process at approximately 300 to 400° C.

Still another aspect of the present application provides a device including the polarized light splitting element, for example, a light radiating device. The exemplary device may include the polarized light splitting element and an apparatus onto which a target is mounted.

Here, the polarized light splitting element may be a polarizing plate. The polarizing plate may be used, for example, to produce linearly polarized light from light radiated from a light source. The polarizing plate may be included in a device such that the light radiated from the light source is incident on the polarizing plate and then radiated to a mask. Also, for example, when the device includes a light collecting plate, the polarizing plate may be present in a position in which the light radiated from the light source is collected into the light collecting plate and then incident on the polarizing plate.

As the polarizing plate, any one capable of producing linearly polarized light among the light radiated from the light source may be used without particular limitation. Such a polarizing plate, a glass plate disposed at Brewster's angle or a wire grid polarizing plate may be examples.

In addition, the device may further include a photo-alignment mask between the apparatus onto which a target will be mounted and the polarized light splitting element.

Here, the mask may be installed, for example, to have a distance of approximately 50 mm or less from a surface of the target mounted on the device. The distance may be, for example, more than 0 mm, 0.001, 0.01, 0.1 or 1 mm or more. In addition, the distance may be 40, 30, 20, or 10 mm or less. The distance between the surface of the target and the mask may be designed in various combinations of the above-described upper and lower limits.

Here, a kind of the apparatus onto which the target is mounted is not particularly limited and may include all kinds of apparatuses designed to stably maintain the target during light radiation.

In addition, the device may further include a light source capable of radiating light onto the mask. As the light source, any one capable of radiating light in a direction of the mask may be used depending on the purpose, without particular limitation. For example, when alignment of the photo-alignment film or exposure of the photoresist is to be performed through light guided to an opening of the mask, as a light source, a light source enabling UV radiation is used, and may be a high-pressure mercury UV lamp, a metal halide lamp, or a gallium UV lamp.

The light source may include one or a plurality of light radiating means. When a plurality of light radiating means are included, the number or arrangement of the light radiating means is not particularly limited. When the light source includes a plurality of light radiating means, the light radiating means are arranged in at least two columns, in which a light radiating means located on any one of the at least two columns may cross a light radiating means located on another column adjacent to the previously selected column.

The sentence "light radiating means may overlap each other" may mean that a line connecting centers of a light radiating means present on any one of the columns and a light radiating means present on another column adjacent to the previously selected column is formed in a direction (direction inclined at a predetermined angle) that is not parallel to a direction perpendicular to respective columns, and radiation areas of the light radiating means overlap each other in a certain part in a direction perpendicular to the respective columns.

FIG. 4 is a diagram of the arrangement of a light radiating means described above. In FIG. 4, a plurality of light radiating means 10 may be disposed in two columns, that is, a column A and a column B. Among the light radiating means of FIG. 4, when one represented as 101 is set to a first light radiating means, and one represented as 102 is set to a second light radiating means, a line P connecting centers of the first and second light radiating means is not parallel to a line C formed in a direction perpendicular to the directions of the columns A and B. In addition, an radiation area of the first light radiating means and an radiation area of the second light radiating means may overlap each other by a range of Q in a direction perpendicular to the directions of the columns A and B.

According to the above-describe arrangement, the intensity of light radiated from the light source may be uniformly maintained. Here, a degree of overlap of one light radiating means with another light radiating means, for example, a length of Q in FIG. 4 is not particularly limited. For example, the overlap degree may be, for example, approximately $1/3$ to $2/3$ of a diameter of the light radiating means, for example, L of FIG. 4.

In addition, the device may further include at least one light collecting plate to control the intensity of light radiated from a light source. For example, the light collecting plate may be included in the device such that collected light is radiated to the polarized light splitting element and the mask after the light radiated from the light source is incident and collected on the light collecting plate. As the light collecting plate, any one conventionally used in the art may be used as long as it is formed to collect light radiated from a light source. As the light collecting plate, a lenticular lens layer may be used.

FIG. 5 is a diagram of an example of a light radiating device. The device of FIG. 5 includes a light source 10, a light collecting plate 20, a polarizing plate 30, a mask 40, and an apparatus onto which a target 50 is mounted, which are sequentially disposed. In the device of FIG. 5, light radiated from the light source 10 is first incident on and collected in the light collecting plate 20, and then incident on the polarizing plate 30. The light incident on the polarizing plate 30 is produced as linearly polarized light, incident on the mask 40, and guided by an opening to be radiated onto a surface of the target 50.

Yet another aspect of the present application provides a method of radiating light. An exemplary method may be performed using the above-described light radiating device. For example, the method may include mounting a target on an apparatus onto which the target will be mounted, and radiating light to the target by means of the polarized light splitting element and the mask.

In one example, the target may be a photo-alignment film. In this case, the light radiating method may be a method of manufacturing an ordered photo-alignment film. For example, a photo-alignment film expressing alignability may be manufactured by ordering a photosensitive material included in the photo-alignment film in a predetermined direction by radiating linearly polarized light by means of a polarized light splitting element and a mask in a state in which the photo-alignment film is immobilized with the apparatus.

The kind of the photo-alignment film capable of being applied to the method is not particularly limited. In a corresponding field, as a compound including a photosensitive residue, various kinds of photo-alignment compounds capable of being used to form the photo-alignment film are known, and all of the known materials may be used to form the photo-alignment film. As the photo-alignment compound, for example, a compound ordered by trans-cis photoisomerization, a compound ordered by photo-destruction such as chain scission or photo-oxidation; a compound ordered by photocrosslinking or photopolymerization such as [2+2] cycloaddition, [4+4] cycloaddition or photodimerization; a compound ordered by photo-Fries rearrangement; or a compound ordered by ring opening/closure may be used. As the compound ordered by trans-cis photoisomerization, for example, an azo compound such as a sulfonated diazo dye or an azo polymer or a stilbene compound may be used, and as the compound ordered by photo-destruction, cyclobutane-1,2,3,4-tetracarboxylic dianhydride, aromatic polysilane or polyether, polystyrene, or polyimide may be used. In addition, as the compound ordered by photocrosslinking or photopolymerization, a cinnamate compound, a coumarin compound, a cinnamamide compound, a tetrahydrophthalimide compound, a maleimide compound, a benzophenone compound or a diphenylacetylene compound, or a compound (hereinafter, referred to as a chalcone compound) having a chalconyl residue, or a compound (hereinafter, referred to as an anthracenyl compound) having an antracenyl residue as a photosensitive residue may be used. As the compound ordered by photo-Fries rearrangement, an aromatic compound such as a benzoate compound, a benzoamide compound, or a methacrylamidoaryl methacrylate compound may be used, and as the compound ordered by ring opening/closure, a compound ordered by ring opening/closure of a [4+2] π-electronic system such as a spiropyran compound may be used, but the present application is not limited thereto. According to a known method using such a photo-alignment compound, the photo-alignment film may be formed. For example, the photo-alignment film may be formed on a suitable supporting base using the compound, and may be transferred by an apparatus onto which a target will be mounted, for example, a roll, and applied to the method.

In the method, the photo-alignment film onto which light is radiated by means of a polarized light splitting element and a mask may be a photo-alignment film treated by first alignment. The first alignment may be performed by radiating UV rays linearly polarized in a certain direction through the polarized light splitting element onto the photo-alignment film, for example, the entire surface of the photo-alignment film, before light is radiated using the mask. While light is radiated onto the photo-alignment film treated by the first alignment using the mask, when light polarized in a different direction from the first alignment is radiated, the light may be radiated only onto a region of the photo-alignment film corresponding to an opening, and the light-alignment compound may be reordered, thereby manufacturing the photo-alignment film in which an ordering direction of the photo-alignment compound is patterned.

When linearly polarized UV rays are radiated one or more times to align the photo-alignment film, for example, the alignment of the alignment layer is determined by a direction of polarizing light finally radiated. Accordingly, when the first alignment is performed by radiating the UV rays linearly polarized in a certain direction through the polarized light splitting element, and then a predetermined part of the photo-alignment film is exposed to light linearly polarized in a different direction from that used in the first alignment, only in the predetermined part irradiated with the light, a direction of the alignment layer may be changed to the different direction from that in the first alignment. Thus, a pattern including at least a first alignment region having a first alignment direction and a second alignment region having a second alignment direction different from the first alignment direction, or at least two kinds of alignment regions having different alignment directions, may be formed in the photo-alignment film.

In one example, a polarization axis of the linearly polarized UV rays radiated in the first alignment may be perpendicular to a polarization axis of the linearly polarized UV rays radiated in the second alignment. The term "perpendicular" used herein may mean substantially perpendicular. The photo-alignment film manufactured by controlling the polarization axis of the light radiated in the first and second alignments by the above described method may be used in, for example, an optical filter capable of realizing a three-dimensional image.

For example, an optical filter may be manufactured by forming a liquid crystal layer on the photo-alignment film formed as described above. A method of forming a liquid crystal layer is not particularly limited, and may be formed by, for example, coating and aligning a liquid crystal compound which can be crosslinked or polymerized by light on the photo-alignment film, and crosslinking or polymerizing the liquid crystal compound by radiating light onto a layer of the liquid crystal compound. Throughout the above-described operation, the layer of the liquid crystal compound may be aligned and immobilized according to alignment of the photo-alignment film, thereby manufacturing a liquid crystal film including at least two kinds of regions having different alignment directions.

The kind of the liquid crystal compound coated on the photo-alignment film is not particularly limited, and may be suitably selected according to a use of the optical filter. For example, when the optical filter is a filter for realizing a three-dimensional image, the liquid crystal compound may be a liquid crystal compound aligned according to an alignment pattern of the underlying alignment layer and capable of forming a liquid crystal polymer layer exhibiting λ/4 retardation characteristics by photocrosslinking or photopolymerization. The term "λ/4 retardation characteristics" used herein may refer to characteristics capable of retarding incident light by ¼ times a wavelength thereof. When such a liquid crystal compound is used, for example, an optical filter capable of dividing the incident light into left-circularly polarized light and right-circularly polarized light may be manufactured.

A method of coating the liquid crystal compound and ordering the liquid crystal compound by alignment, that is, according to an alignment pattern of the underlying alignment layer, or crosslinking or polymerizing the ordered liquid crystal compound, is not particularly limited. For example, the alignment may be performed by maintaining the liquid crystal layer at a suitable temperature in which the compound can exhibit liquid crystallinity depending on the kind of the liquid crystal compound. In addition, the crosslinking or polymerization may be performed by radiating light in a level of inducing suitable crosslinking or polymerization depending on the kind of the liquid crystal compound onto the liquid crystal layer.

Effects of Invention

A polarized light splitting element of the present application has excellent durability to UV rays and heat, and low pitch dependence of polarization characteristics so that it may be easily manufactured. In addition, the polarized light splitting element of the present application may realize a high polarization degree and extinction ratio even in a short wavelength range.

MODES FOR INVENTION

Figure 1:
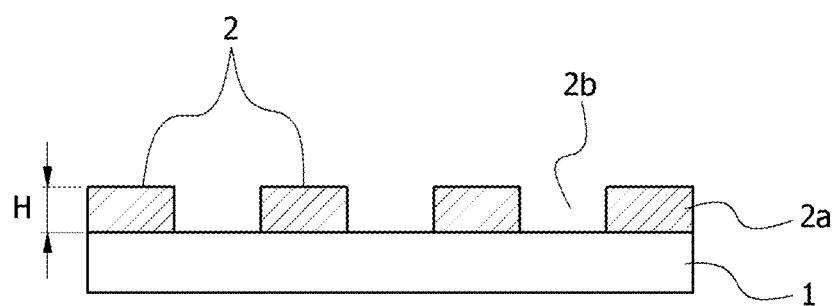
FIG. 1 is a cross-sectional view of an exemplary polarized light splitting element.
Figure 2:
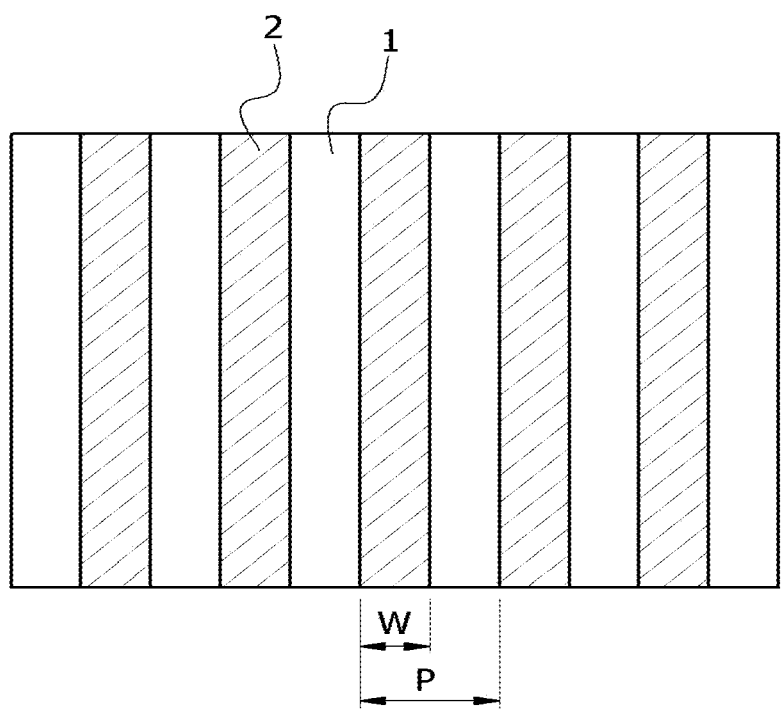
FIG. 2 is a schematic top view of the exemplary polarized light splitting element.
Figure 3:
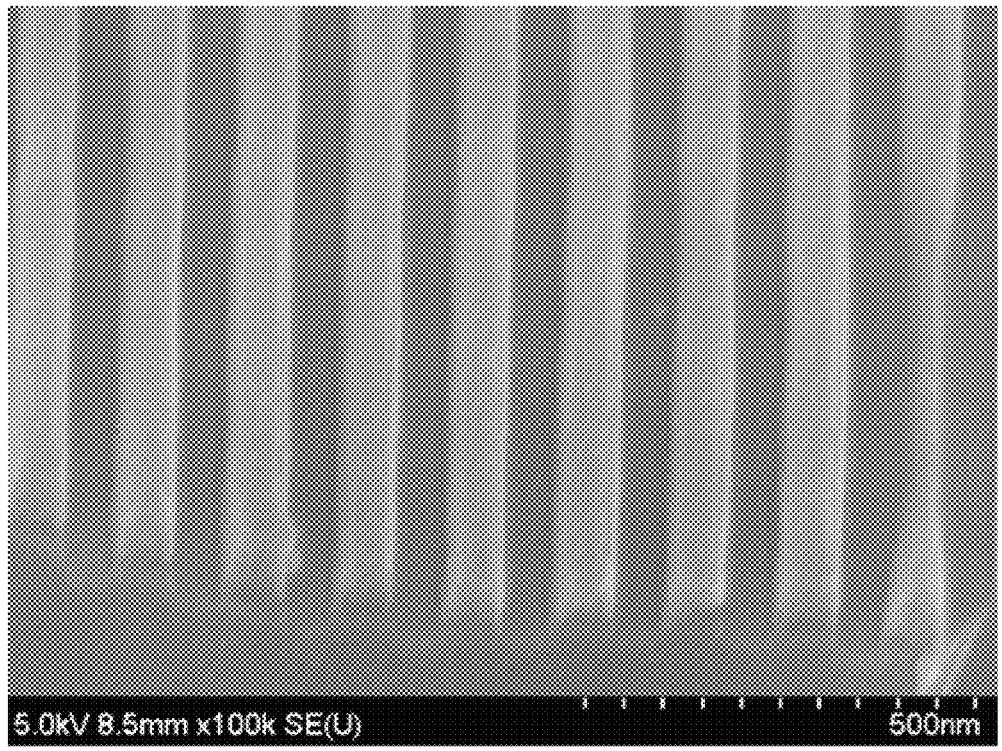
FIG. 3 is an image of the exemplary polarized light splitting element taken from above.
Figure 4:
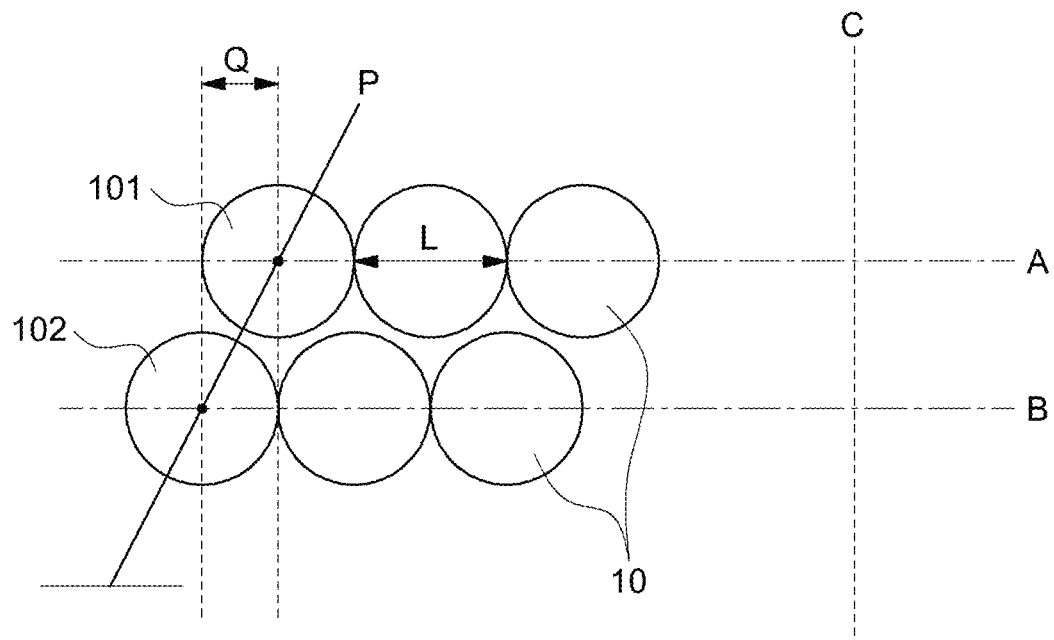
FIG. 4 is a diagram of arrangement of an exemplary light radiating means.
Figure 5:
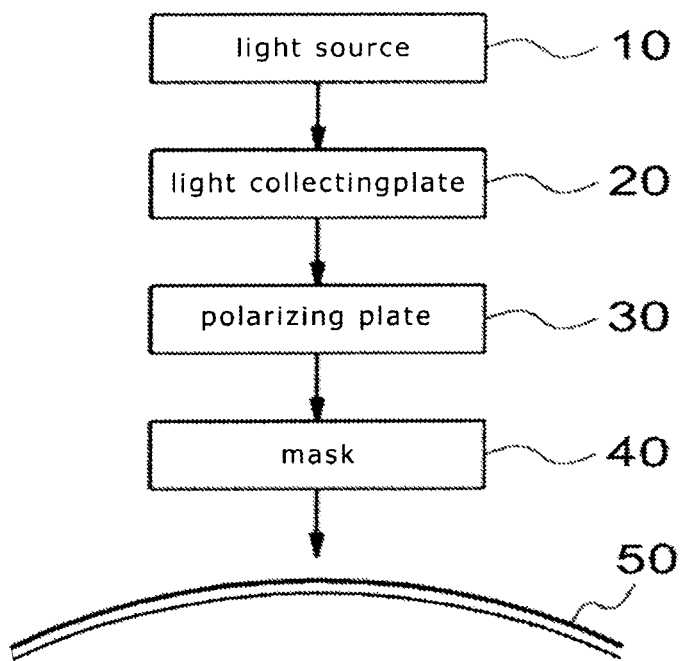
FIG. 5 is a diagram of an exemplary light radiating device.

Though the present application will be described in more detail with reference to Examples and Comparative Example below, the scope of a polarized light splitting element of the present application is not limited to the following Examples.

Manufacture of Polarized Light Splitting Element

Example 1

Impurities on a surface of quarts glass were removed by ultrasonic cleaning in acetone and isopropyl alcohol (IPA) each at 60° C. for 20 minutes. Subsequently, a GaAs thin film (refractive index with respect to light having a wavelength of 300 nm: 3.69, extinction coefficient: 1.97) was deposited to a thickness of 50 nm on the quartz glass through E-beam evaporation at a speed of 1 Å/sec. Mr-8010r produced by Micro Resist was spin-coated on the deposited GaAs thin film to have a thickness of 100 nm and then baked at 95° C. for 1 minute. Afterward, imprinting was performed using an imprinting master with a pitch of 150 nm. In the imprinting, a press was set to 160° C., maintained at 40 Bar for 3 minutes, cooled for 2 minutes, and demolded at 100° C. Then, the GaAs was dry-etched using an ICP RIE apparatus. After that, the resist for imprinting was removed using acetone as an organic solvent, thereby manufacturing a polarized light splitting element having a width (W) of a convex part of 75 nm and a pitch (P) of 150 nm.

Example 2

An InP polarized light splitting element having a width (W) of a convex part of 75 nm and a pitch (P) of 150 nm was manufactured by the same method as described in Example 1, except that an InP thin film (refractive index with respect to light having a wavelength of 300 nm: 3.2, extinction coefficient: 1.74) was deposited on quartz glass to have a thickness of 50 nm through e-beam evaporation.

Example 3

A silicon polarized light splitting element having a width (W) of a convex part of 75 nm and a pitch (P) of 150 nm was manufactured by the same method as described in Example 1, except that a silicon thin film (refractive index with respect to light having a wavelength of 300 nm: 5, extinction coefficient: 4.09) was deposited on quartz glass to have a thickness of 50 nm through e-beam evaporation.

Comparative Example

Impurities on a surface of quarts glass were removed by ultrasonic cleaning in acetone and isopropyl alcohol (IPA) each at 60° C. for 20 minutes. Subsequently, an aluminum thin film (refractive index with respect to light having a wavelength of 300 nm: 0.28, extinction coefficient: 3.64) was deposited to a thickness of 200 nm on the quartz glass through e-beam evaporation at a speed of 1 Å/sec. Mr-8010r produced by Micro Resist was spin-coated on the deposited aluminum thin film to have a thickness of 100 nm and then baked at 95° C. for 1 minute. Afterward, imprinting was performed using an imprinting master with a pitch of 150 nm. In the imprinting, a press was set to 160° C., maintained at 40 Bar for 3 minutes, cooled for 2 minutes, and demolded at 100° C. Then, the aluminum was dry-etched using an ICP RIE apparatus. After that, the resist for imprinting was removed using acetone as an organic solvent, thereby manufacturing an aluminum polarized light splitting element having a width (W) of a convex part of 75 nm and a pitch (P) of 150 nm.

Experimental Example

Physical properties of the polarized light splitting elements manufactured in Examples 1 to 3 and the Comparative Example were evaluated by the following methods:

Measurement Method 1: Measurement of Transmittance

After a polarized light source was formed by inserting two sheets of unused aluminum polarized light splitting elements into a transmittance measuring apparatus, the manufactured polarized light splitting element was placed perpendicular to a polarization direction and Tp and Tc were measured. Here, Tp represents a transmittance of polarization parallel to a convex part, and Tc represents a transmittance of polarization perpendicular to a convex part.

Measurement Method 2: Measurement of Refractive Index and Extinction Coefficient A refractive index and an extinction coefficient of a convex part of the polarized light splitting element manufactured in each of the Examples and Comparative Example were measured by radiating light having a wavelength of 300 nm onto the polarized light splitting element using a spectroscopic ellipsometer and oscillation modeling.

TABLE 1

| Wavelength (nm) | Material of convex part | Real optical constant | |
|---|---|---|---|
| | | Refractive index | Extinction coefficient |
| 250 | GaAs | 2.89 | 4.05 |
| | InP | 2.55 | 3.51 |
| | Si | 1.7 | 3.68 |
| | Al | 0.20 | 3.0 |

TABLE 1-continued

| Wavelength (nm) | Material of convex part | Real optical constant | |
|---|---|---|---|
| | | Refractive index | Extinction coefficient |
| 275 | GaAs | 3.92 | 2.90 |
| | InP | 3.65 | 2.06 |
| | Si | 1.87 | 5.00 |
| | Al | 0.23 | 3.3 |
| 300 | GaAs | 3.69 | 1.97 |
| | InP | 3.20 | 1.74 |
| | Si | 5.0 | 4.09 |
| | Al | 0.28 | 3.64 |
| 325 | GaAs | 3.50 | 1.91 |
| | InP | 3.10 | 1.78 |
| | Si | 5.13 | 3.18 |
| | Al | 0.33 | 3.95 |
| 350 | GaAs | 3.52 | 2.00 |
| | InP | 3.19 | 1.95 |
| | Si | 5.5 | 2.90 |
| | Al | 0.39 | 4.3 |

Calculation of Effective Refractive Index of the Polarized Light Splitting Element W and P values of each of the polarized light splitting elements of Examples 1 to 3 and Comparative Example, a refractive index ($n_1$) of a dielectric material (air), and an optical coefficient ($n_2$) of a convex part of the polarized light splitting element measured above were assigned to Equations 1 and 2, and the results are shown in Table 2.

TABLE 2

| Wavelength (nm) | Material of convex part | Real optical constant $n_2$ | Effective refractive index | |
|---|---|---|---|---|
| | | | $N_{//}$ (a + bi) | $N_\perp$ (c + di) |
| 250 | GaAs | 2.89 + 4.05i | 2.09 + 2.81i | 1.42 + 0.028i |
| | InP | 2.55 + 3.51i | 1.85 + 2.42i | 1.42 + 0.037i |
| | Si | 1.7 + 3.68i | 1.24 + 2.52i | 1.44 + 0.035i |
| | Al | 0.20 + 3.0i | 0.15 + 2.0i | 1.50 + 0.012i |
| 275 | GaAs | 3.92 + 2.90i | 2.13 + 1.99i | 1.41 + 0.042i |
| | InP | 3.65 + 2.06i | 2.65 + 1.42i | 1.39 + 0.033i |
| | Si | 1.87 + 5.00i | 1.87 + 3.48i | 1.44 + 0.040i |
| | Al | 0.23 + 3.3i | 0.17 + 2.22i | 1.48 + 0.010i |
| 300 | GaAs | 3.69 + 1.97i | 2.68 + 1.35i | 1.39 + 0.032i |
| | InP | 3.20 + 1.74i | 2.35 + 1.19i | 1.38 + 0.042i |
| | Si | 5.0 + 4.09i | 3.58 + 2.86i | 1.41 + 0.017i |
| | Al | 0.28 + 3.64i | 0.21 + 2.48i | 1.47 + 0.009i |
| 325 | GaAs | 3.50 + 1.91i | 2.55 + 1.31i | 1.39 + 0.036i |
| | InP | 3.10 + 1.78i | 1.58 + 1.18i | 1.39 + 0.088i |
| | Si | 5.13 + 3.18i | 3.67 + 2.22i | 1.41 + 0.017i |
| | Al | 0.33 + 3.95i | 0.24 + 2.70i | 1.46 + 0.008i |
| 350 | GaAs | 3.52 + 2.00i | 2.56 + 1.37i | 1.39 + 0.035i |
| | InP | 3.19 + 1.95i | 2.34 + 1.33i | 1.39 + 0.043i |
| | Si | 5.5 + 2.90i | 3.94 + 2.02i | 1.40 + 0.017i |
| | Al | 0.39 + 4.3i | 0.28 + 2.96i | 1.45 + 0.0074i |

Calculation of Extinction Ratio

Based on the transmittance measured according to each wavelength band, an extinction ratio (Tc/Tp) was calculated. Extinction ratios by wavelength bands of Examples 1 to 3 and Comparative Example are shown in Table 3.

TABLE 3

Extinction ratios by materials of polarized light splitting elements composed of Al and light absorbing material

| | Extinction ratio in each wavelength band | | | | |
|---|---|---|---|---|---|
| | 250 nm | 275 nm | 300 nm | 325 nm | 350 nm |
| Example 1 | 51.50074 | 291.3341 | 234.8004 | 294.8964 | 532.1686 |
| Example 2 | 13.4354 | 166.7665 | 73.3974 | 1064.73 | 1711.022 |
| Example 3 | 34.71716 | 204.9879 | 207.9338 | 683.9417 | 1762.759 |
| Comparative Example | 0.233146 | 6.649053 | 38.55189 | 89.0692 | 134.102 |

As shown in Table 1, in the cases of GaAs, InP, and Si included in a convex part, the refractive index with respect to light having a wavelength of 300 nm was 1 to 10, and the extinction coefficient with respect to light having a wavelength of 300 nm was 0.5 to 10. In the case of Al, since the extinction coefficient with respect to light having a wavelength of 300 nm was 3.64, and the refractive index with respect to light having a wavelength of 300 nm was 0.28, Al was not included in the light absorbing material of the present application.

As seen from Table 2, like Examples 1 to 3, when a convex part was formed using GaAs, InP or silicon, in $n_{//}$, a in the case of Al, which is Comparative Example, was less than 0.74, and a in the case of Si, which is an Example, was 0.74 or more, which was higher than in the case of Al, and b was higher in the case of Si than the case of Al.

In addition, as shown in Table 3, in a UV wavelength band, compared to the polarized light splitting element manufactured in Comparative Example, the polarized light splitting elements manufactured in Examples 1 to 3 had considerably higher extinction ratios, even though they were manufactured to have the same pitch of 150 nm as in Comparative Example.

Figure 6:
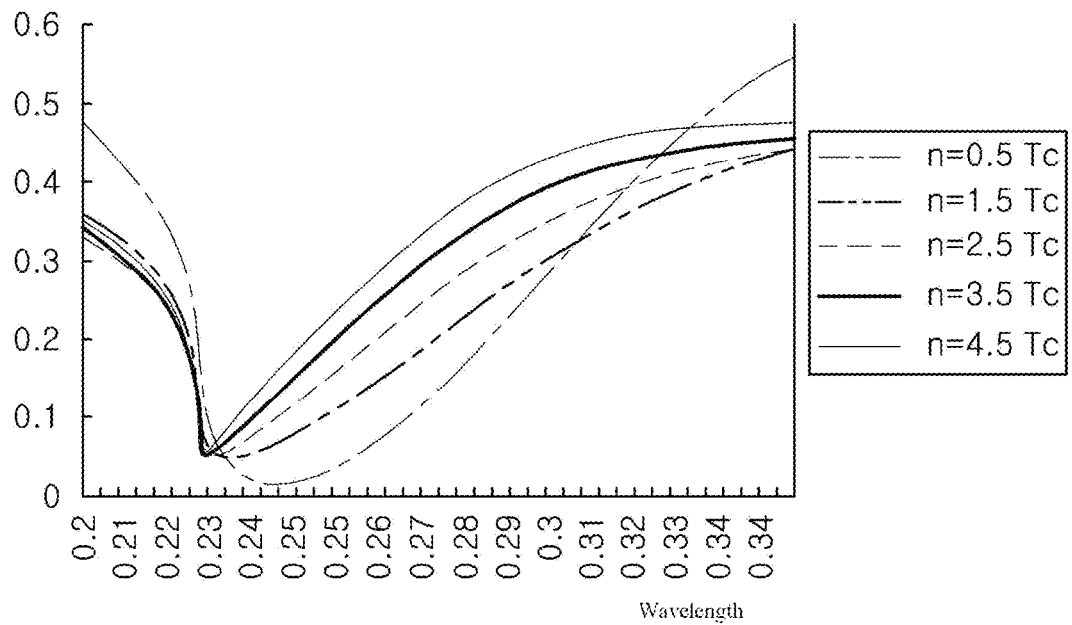
FIG. 6 is a graph showing Tc values of a polarized light splitting element including unevenness formed of silicon of Example 3 according to an increase in refractive index in a UV region, when an extinction coefficient of the polarized light splitting element is fixed.
Figure 7:
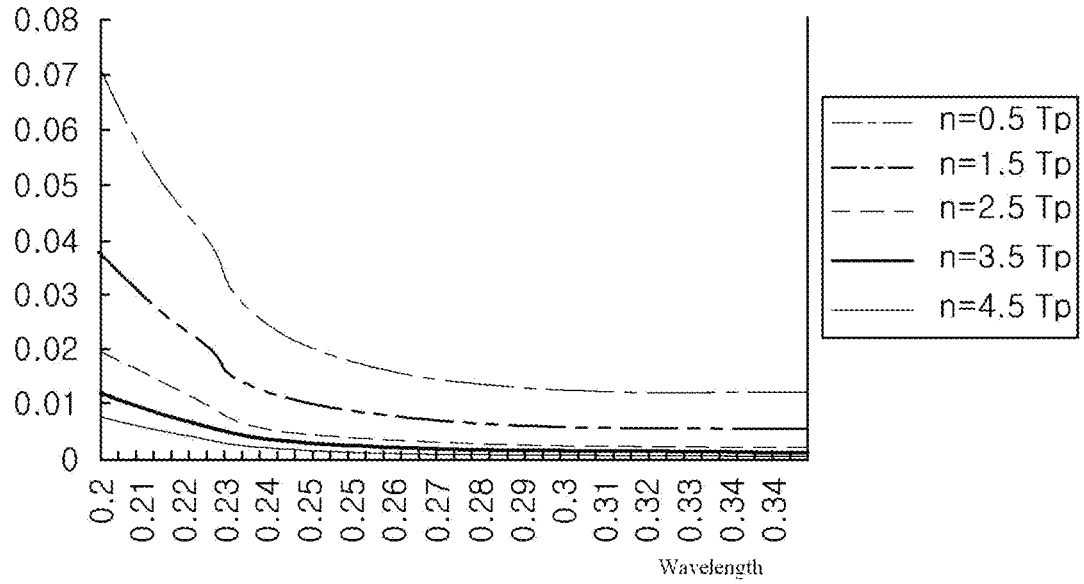
FIG. 7 a graph showing Tp values of the polarized light splitting element including unevenness formed of silicon of Example 3 according to an increase in refractive index in a UV region, when the extinction coefficient of the polarized light splitting element is fixed.

In addition, referring to FIG. 6, when the polarized light splitting element having a convex part formed of silicon in Example 1 had a certain extinction coefficient in a UV region, particularly, in a wavelength band from 250 to 310 nm, as the refractive index increased, the value of Tc generally increased. In this case, a width of the transmittance increased toward a short wavelength region, and as shown in FIG. 7, as the refractive index in the UV region increased, the value of Tp decreased. That is, the polarized light splitting element in which a convex part was formed of silicon had a high extinction ratio in a short wavelength range.

Figure 8:
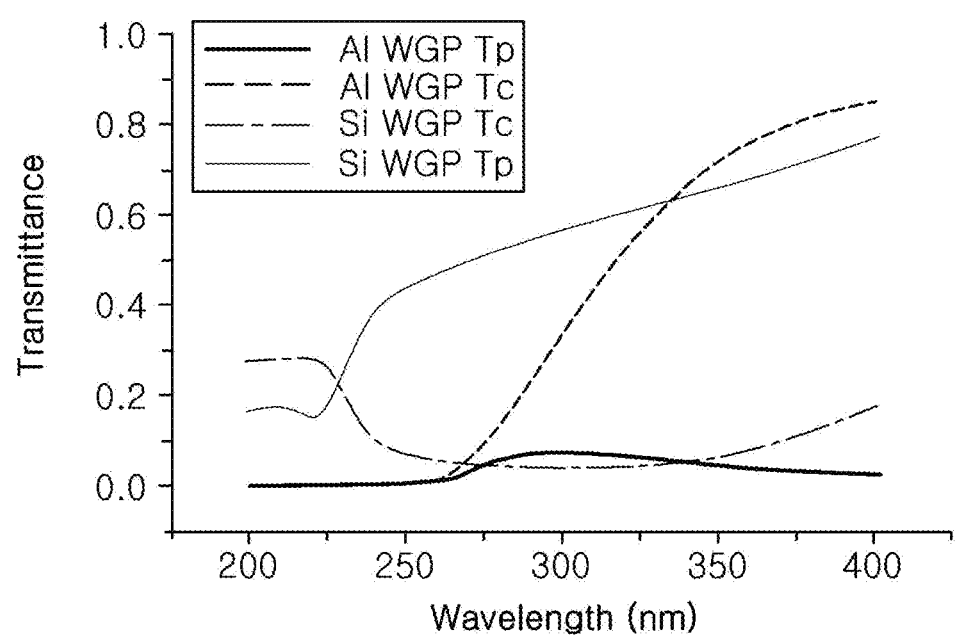
FIG. 8 is a graph showing Tc and Tp of polarized light splitting elements manufactured in Example 3 and a Comparative Example.

In addition, Tc and Tp of the polarized light splitting elements manufactured to have the same pitch of 150 nm according to Example 3 and Comparative Example were measured using a spectrometer produced by N & K, and the results are shown in FIG. 8. As shown in FIG. 8, the polarized light splitting element in which a convex was formed of silicon had a very excellent polarization separating property, and in a short wavelength range (approximately 250 to 270 nm) compared to that in which the convex part was formed of aluminum, and a height (50 nm) of the convex part of the polarized light splitting element having the convex part formed of silicon was smaller than that (150 nm) of the convex part of the polarized light splitting element having the convex part formed of aluminum, and thus the polarized light splitting element was easily manufactured.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An ultraviolet (UV) polarized light splitting element, comprising:
    a substrate; and
    an unevenness having a convex part including a light absorbing material having a refractive index of 3.2 to 10 and an extinction coefficient of 0.5 to 10 with respect to light having a wavelength of 300 nm, and a concave part including a dielectric material, the unevenness being formed on the substrate,
    wherein the convex part has a pitch of 100 to 180 nm, a width of 50 to 80 nm, and a ratio (W/P) of a width (W) of the convex part to a pitch (P) of the convex part is 0.2 to 0.8,
    wherein in the following Equation 1, a is 0.74 to 10, and b is 0.05 to 10, and in the following Equation 2, c is 1.3 to 10 and d is 0.013 to 0.1:

$$(a+bi)^2 = n_1^2 \times (1-W/P) + n_2^2 \times W/P \quad \text{[Equation 1]}$$

$$(c+di)^2 = n_1^2 \times n_2^2 / ((1-W/P) \times n_2^2 + W \times n_1^2/P) \quad \text{[Equation 2]}$$

where i is an imaginary number, $n_1$ represents a refractive index of the dielectric material with respect to light having a wavelength of 300 nm, $n_2$ represents a refractive index of the convex part with respect to light having a wavelength of 300 nm.

2. The element according to claim 1, wherein the refractive index of the dielectric material with respect to light having a wavelength from 250 to 350 nm is 1 to 3.

3. The element according to claim 1, wherein the refractive index of the convex part with respect to light having a wavelength from 250 to 350 nm is 3.2 to 10.

4. The element according to claim 1, wherein the convex part has an extinction coefficient of 0.5 to 10 with respect to light having a wavelength in a UV region.

5. The element according to claim 1, wherein the light absorbing material is at least one selected from the group consisting of silicon, titanium oxide, zinc oxide, zirconium oxide, tungsten, tungsten oxide, gallium arsenide, gallium antimonide, aluminum gallium arsenide, cadmium telluride, chromium, molybdenum, nickel, gallium phosphide, indium gallium arsenide, indium phosphide, indium antimonide, cadmium zinc telluride, tin oxide, cesium oxide, strontium titanium oxide, silicon carbide, iridium, iridium oxide, or zinc selenium telluride.

6. The element according to claim 1, D calculated by Equation 3 is 0.67 to 0.98:

$$D = (Tc-Tp)/(Tc+Tp), \quad \text{[Equation 3]}$$

where Tc represents a transmission rate of light having a wavelength of 250 to 350 nm polarized in a direction perpendicular to the convex part with respect to the polarized light splitting element, and Tp represents a transmission rate of light having a wavelength of 250 to 350 nm polarized in a direction parallel to the convex part with respect to the polarized light splitting element.

7. The element according to claim 1, wherein the convex part has a height of 20 to 300 nm.

8. The element according to claim 1, wherein R calculated by Equation 4 is 2 to 2000:

$$R = Tc/Tp, \quad \text{[Equation 4]}$$

where Tc represents a transmission rate of light having a wavelength of 250 to 350 nm polarized in a direction perpendicular to the convex part with respect to the polarized light splitting element, and Tp represents a transmission rate of light having a wavelength of 250 to 350 nm polarized in a direction parallel to the convex part with respect to the polarized light splitting element.

9. A method of manufacturing the UV polarized light splitting element of claim 1, comprising:
    forming the convex part on the substrate using the light absorbing material; and
    forming the unevenness by introducing the dielectric material into the concave part formed by the convex part.

10. A light radiating device, comprising:
    an apparatus onto which a target is loaded; and
    the polarized light splitting element of claim 1.

11. The device according to claim 10, further comprising:
    a photo-alignment mask between the apparatus onto which the target is loaded and the polarized light splitting element.

12. The device according to claim 11, further comprising:
    a light source capable of radiating linearly polarized light toward a mask.

13. A method of radiating light, comprising:
    loading a target onto the apparatus onto which the target is loaded of the device of claim 11; and
    radiating light onto the target by means of a polarized light splitting element and a mask.

14. A method of forming an arranged photo-alignment film, comprising:
    loading a target onto the apparatus onto which the target is loaded of the device of claim 11; and
    radiating linearly polarized light onto the photo-alignment film by means of a polarized light splitting element and a mask.

* * * * *